March 3, 1942.   E. I. BUCKLEY   2,274,974
LENS SYSTEM
Filed Aug. 9, 1940
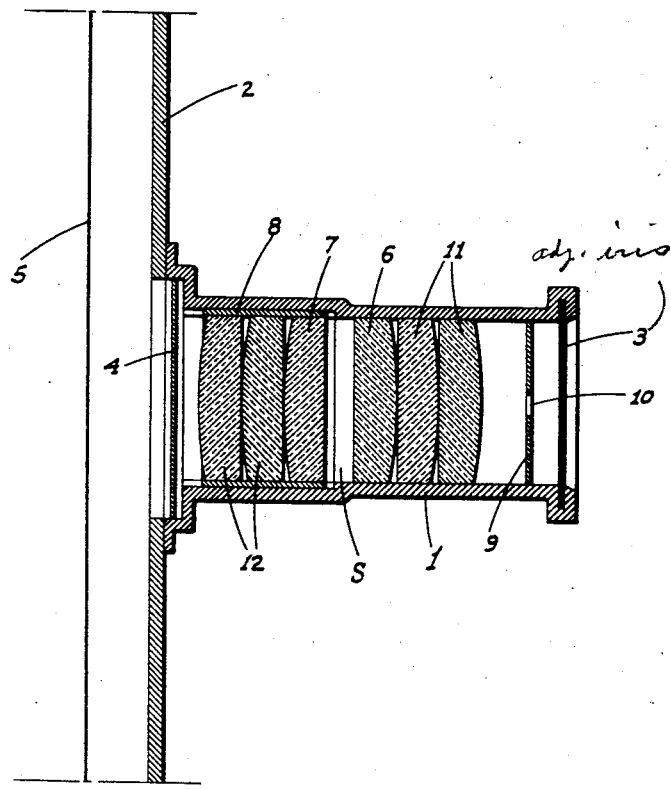
INVENTOR
E. I. Buckley
BY
ATTORNEYS

UNITED STATES PATENT OFFICE 2,274,974

LENS SYSTEM

Earl I. Buckley, Sacramento, Calif.

Application August 9, 1940, Serial No. 351,994

5 Claims. (Cl. 88—57)

This invention relates in general to an improvement in photographic apparatus, and in particular the invention is directed to a unique lens system adapted for use in connection with both still picture and motion picture type cameras.

The principal object of the invention is to provide a lens system designed to produce true depth or third dimension in the resulting photographic negative whereby the picture printed or projected therefrom likewise is third dimensional in effect.

Another object of the invention is to provide a lens system which not only produces negatives wherein the image is in third dimension, but which system is of fixed focus and thus requires no adjustment subsequent to proper adjustment at the factory.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

The figure of the drawing is a somewhat diagrammatic, enlarged longitudinal sectional elevation of my improved lens system as mounted on a camera.

Referring now more particularly to the characters of reference on the drawing, the numeral 1 indicates the lens barrel mounted in conventional manner on and projecting outwardly from the front 2 of a camera case; the inner end of said barrel opening into the interior of said camera case.

At its outer end the barrel is fitted with a manually adjustable light entry control iris 3; while at or adjacent the inner end of said barrel, a suitable manually actuated shutter 4 is mounted. The film 5 is disposed in the camera case inwardly of shutter 4 and is disposed or carried in conventional manner. The type of shutter and manner of supporting and transporting the film will depend, of course, on whether the camera is of still or motion picture type.

The improved lens system per se comprises a pair of lenses, indicated at 6 and 7, which are flat on adjacent or inner faces and convex on their opposite or outer faces; the convexity of said outer faces of the lenses being that of a sphere of relatively great diameter, or in other words a relatively slight convexity. The lens 7 is fixed in the forward end of a sleeve 8, and the inner end portion of barrel 1 is enlarged internally for the reception of such sleeve; the lens 6 being fixed in barrel 1 ahead of said sleeve.

A closure disc or mask 9 is mounted in barrel 1 parallel to and immediately rearwardly of iris 3; such mask 9 being formed with a central and circular light entry aperture 10 of extremely small diameter relative to the diameter of lenses 6 and 7.

In order to produce the desired picture or image size in the plane of film 5, a pair of supplementary and matching lenses 11 are mounted in the barrel immediately ahead of lens 6; and another pair of supplementary and matching lenses 12 are mounted in sleeve 8 immediately inwardly of lens 7.

When the above described lens system is assembled at the factory, the sleeve 8 is initially movable longitudinally relative to the barrel 1 whereby the assembly may be prefocused. This is accomplished by placing a ground glass or the like in the plane to be occupied by the film 5, and thereafter manipulating sleeve 8 and lens 7 longitudinally relative to lens 6 varying space S until objects from a point relatively close to the camera to infinity are seen on the ground glass in exact and proper focus. The sleeve is then fixed against movement and needs no subsequent adjustment. This "balancing" or focusing of lens 7 on lens 6 until all objects are in focus, such lenses being of the type and in the relation described, together with the use of the small aperture front mask 9, results in a third dimensional image in the plane of film 5 and a third dimensional impression on said film when exposed and developed.

Pictures printed or projected from said film are in natural position as would normally be seen by the eye.

This depth or third dimensional result is believed to result from the use of the small aperture mask in combination with lenses of much larger diameter than said aperture and with lenses flat on one side, preferably adjacent each other; the small aperture of the mask restricting the effective area of lens 6 to the central area thereof preventing bending of the light rays to an extent where the resulting image of all objects in the field of view would be drawn together into a substantially flat plane or with little depth of focus. In other words, my lens system maintains the light rays as straight as possible, and by focusing lens 7 on lens 6 the drawing power of the former is equalized and the desired result obtained.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An objective lens system including in a barrel in focused relation, an aperture plate mounted in the barrel adjacent its object end, two symmetrically arranged components mounted in the barrel inwardly of said aperture plate, each component comprising a plurality of plano-convex lens elements disposed in axial alinement and substantially in contact at their vertex points; the flat faces of corresponding lens elements of said components facing toward each other and the diameter of the aperture in said plate being small relative to the diameter of the said elements whereby to permit only the entry of narrow pencils of light so that a three-dimensional result is obtained in the focal plane image.

2. An objective lens system including in a barrel in focused relation, an aperture plate mounted in the barrel adjacent its object end, an iris diaphragm mounted in the barrel adjacent but ahead of said plate, and two symmetrically arranged components mounted in the barrel inwardly of said plate, each component comprising a plurality of plano-convex lens elements axially alined and substantially in contact at their vertex points; the aperture in said plate being of small diameter relative to the diameter of said lens elements whereby the maximum effective diameter of the iris diaphragm when open permits only the entry of narrow pencils of light so that a great depth of focus is obtained in the resulting image.

3. An objective lens system including in a barrel in focused relation, an aperture plate mounted in the barrel adjacent its object end, an iris diaphragm mounted in the barrel adjacent ahead of said plate, and two symmetrically arranged components mounted in the barrel inwardly of said plate, each component comprising a plurality of plano-convex lens elements axially alined and substantially in contact at their vertex points; the flat faces of corresponding lens elements of said components facing toward each other, and the aperture in said plate being of small diameter relative to the diameter of said lens elements whereby the maximum effective diameter of the iris diaphragm when open permits only the entry of narrow pencils of light so that a great depth of focus is obtained in the resulting image.

4. An objective lens system including in a barrel in focused relation, two symmetrically arranged components each comprising a plurality of plano-convex lens elements axially alined and substantially in contact at their vertex points, and light control aperture means mounted in the barrel at its object end; the maximum effective diameter of said aperture means being small relative to the diameter of said lens elements whereby to permit only the entry of narrow pencils of light so that a great depth of focus is obtained in the resulting image.

5. A lens system as in claim 4 in which the convex face of said separate lens elements is that of a sphere of relatively great diameter.

EARL I. BUCKLEY.